US011288342B2

(12) United States Patent
Karlsson (10) Patent No.: US 11,288,342 B2
(45) Date of Patent: Mar. 29, 2022

(54) INTEGRITY PROTECTED CAPACITY LICENSE COUNTING

(71) Applicant: Telefonaktiebolaget LM Ericsson (publ), Stockholm (SE)

(72) Inventor: Pär Karlsson, Karlskrona (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 335 days.

(21) Appl. No.: 16/329,110

(22) PCT Filed: Sep. 15, 2016

(86) PCT No.: PCT/EP2016/071820
§ 371 (c)(1),
(2) Date: Feb. 27, 2019

(87) PCT Pub. No.: WO2018/050229
PCT Pub. Date: Mar. 22, 2018

(65) Prior Publication Data
US 2020/0184038 A1 Jun. 11, 2020

(51) Int. Cl.
*G06F 21/10* (2013.01)
*H04L 9/06* (2006.01)
*H04L 9/32* (2006.01)

(52) U.S. Cl.
CPC .......... *G06F 21/105* (2013.01); *H04L 9/0637* (2013.01); *H04L 9/3236* (2013.01); *H04L 2209/38* (2013.01)

(58) Field of Classification Search
CPC ... G06F 21/105; H04L 9/0637; H04L 9/3236; H04L 2209/38
See application file for complete search history.

(56) References Cited

U.S. PATENT DOCUMENTS

| 5,260,999 A | 11/1993 | Wyman |
| 6,968,372 B1 | 11/2005 | Thompson et al. |
| 10,592,639 B2* | 3/2020 | Gaidar ............... G06F 21/64 |
| 2002/0077986 A1* | 6/2002 | Kobata ............... H04L 63/062 705/52 |
| 2008/0235805 A1 | 9/2008 | Pfitzmann et al. |

(Continued)

OTHER PUBLICATIONS

Antonopoulos, "Mastering Bitcoin: Unlocking Digital Cryptocurrencies," O'Reilly, all pages. (Year: 2014).*
Wikipedia, the free encyclopedia, Hash Chain; definition of Hash Chain; https://en.wikipedia.org/wiki/Hash_Chain; Sep. 10, 2016; consisting of 2-pages.

(Continued)

*Primary Examiner* — Jacob C. Coppola
(74) *Attorney, Agent, or Firm* — Christopher and Weisberg, P.A.

(57) ABSTRACT

A global count value can be determined in a distributed computing system by maintaining at each node in a plurality of nodes in the distributed computing system a local current count value determined at each node, copies of remote current count values determined at other nodes in the plurality of nodes and communicated to each node and a ledger having a cryptographically protected history of determined local count values and communicated remote count values. The local current count value and the copies of the remote current count values are used to compute the global count value at one or more of the plurality of nodes. In addition, the ledger is used to verify integrity of the history of determined local count values and communicated remote count values.

11 Claims, 7 Drawing Sheets

(56) References Cited

U.S. PATENT DOCUMENTS

| | | | |
|---|---|---|---|
| 2012/0117008 A1 | 5/2012 | Xu et al. | |
| 2012/0303795 A1* | 11/2012 | Mo | H04L 29/08072 709/224 |
| 2014/0130056 A1* | 5/2014 | Goodman | G06F 9/4881 718/104 |
| 2014/0355436 A1* | 12/2014 | Zhang | H04L 41/0896 370/232 |
| 2015/0278820 A1 | 10/2015 | Meadows | |
| 2016/0027229 A1* | 1/2016 | Spanos | G07C 13/00 705/51 |
| 2017/0046664 A1* | 2/2017 | Haldenby | H04L 63/0876 |
| 2017/0116693 A1* | 4/2017 | Rae | H04L 9/3236 |
| 2017/0134161 A1* | 5/2017 | Goeringer | G06Q 20/065 |

OTHER PUBLICATIONS

International Search Report and Written Opinion dated May 26, 2017 for International Application No. PCT/EP2016/071820 filed on Sep. 15, 2016, consisting of 10-pages.

Marc Shapiro, Nuno Preguica, Cados Baquero, Marek Zawirski; Title: Conflict-free Replicated Data Types; [Research Report] RR-7687, p. 18 <inria-00609399v1>; Submitted on Jul. 19, 2011 (v1), last revised Aug. 27, 2011 (v2), consisting of 22-pages.

Jeff Herbert et al.; Title: A Novel Method for Decentralosed Peer-to-Peer Software License Validation Using Cryptocurrency Blockchain Technology; Proceedings of the 38th Australasian Computer Science Conference (ACSC 2015), Sydney, Australia, Jan. 27-30, 2015, consisting of 9-pages.

EPO Communication dated Mar. 1, 2021 for International Application No. 16769932.1, consisting of 5-pages.

* cited by examiner

INTEGRITY PROTECTED CAPACITY LICENSE COUNTING

CROSS-REFERENCE TO RELATED APPLICATIONS

This application is a Submission Under 35 U.S.C. § 371 for U.S. National Stage Patent Application of International Application Number: PCT/EP2016/071820, filed Sep. 15, 2016 entitled "INTEGRITY PROTECTED CAPACITY LICENSE COUNTING," the entirety of which is incorporated herein by reference.

BACKGROUND

Technical Field

Embodiments relate to the field of usage-based licensing enforcement and integrity protected counting in cloud-based computing systems.

Discussion of the Background

Computing systems and computing services such as distributed database systems are licensed under a price-per-unit of available service structure, e.g., a per-subscriber pricing scale. Traditionally a limit on the maximum number of units available to a subscriber is established through a business agreement, and this established limit is provided to the technical system providing the service in the form of a license token containing a value representing the established limit. Alternatively, a business agreement does not establish a limit, and payment is based on actual usage of the system or service. Hybrid approaches can also be used.

Regardless of the approach, metrics for monitoring actual system usage are required. Complicating implementation of these metrics is the use of distributed computing systems spanning multiple computers, servers and domains. The computers and servers can represent actual physical systems and virtualized partitions. In a virtualized cloud environment each server has a limited time life span. In addition, a central data storage is not available or is highly undesirable.

Therefore, managing accurate counters of usage in a distributed system can be complex and problematic. Changing arrangements or servers resulting from the addition or removal of servers within the distributed computing environment add to the complexity. Introducing a centralized or shared database for counting introduces a bottleneck that adversely affects system performance and availability. Centralized databases also represent additional components that need to be actively monitored and managed. Protecting the integrity of any counting system from tampering and manipulation, e.g., fraudulent changes to counters, introduces additional complexity into the system. Distributed computing environments multiply this complexity by introducing multiple potential points for attacking the integrity of the system.

SUMMARY

In various embodiments, a distributed computing system architecture is utilized, and this distributed structure is leveraged to provide the desired counting and integrity protection without a central storage or central coordination mechanism. Therefore, each component or node in the distributed computing system maintains a local view of each count value. Each local view is maintained, e.g., inside a java virtual machine (JVM) or server, by recording the state or value of a local counter periodically. Each recorded local count value is associated with a version identifier, e.g., a timestamp. Integrity of the recorded local counter values is provided by incorporating each recorded local counter value and associated version identifier in a hash chain that is stored locally, i.e., at each node, in persistent storage. This forms a cryptographically protected history of the local count values.

In addition to the local current count value and version identifier and cryptographically protected history of these values, each node exchanges count values, version identifiers and cryptographically protected histories with other nodes in the distributed computing system, for example, on a regular basis. For example, a local node receives from a remote node a remote count value, a remote version identifier associated with the remote count value and a remote cryptographically protected history. The remote count and version identifier are used to update the local versions of the remote count, and the communicated information is added to the cryptographically protected history of the receiving local node, i.e., added to the hash chain at the local node.

According to some embodiments, communication or exchange of count values and histories between nodes is not provided in dedicated communications but is included or "piggy backed" on other communications that are otherwise unrelated to the communication of count values and count histories, for example, communications exchanged as part of the functioning of the distributed computing system. Integrating the communicated count values and cryptographically protected histories into existing distributed computing system communications inhibits circumvention of this exchange.

The local count values and remote count values maintained at any node within the distributed computing system are used to determine a global state or global counter value at individual nodes in the distributed computing system. In one embodiment, the global counter value is established by summing the local count value and remote count values at an individual node. In addition to facilitating determination of a global count value at individual nodes, the integrity of the exchange of count values among the nodes is also determined. Integrity is determined using the cryptographically protected history maintained at each node. As the local cryptographically protected history, e.g., hash chain, at individual nodes includes entries from the other remote nodes, verification of the integrity of the count value exchanges covers not just an individual local node but also other nodes in the distributed computing system. Integrity verification checks for tampering with the counters and exchanged count values.

Thus, according to one embodiment, a method of maintaining a global count value in a distributed computing system includes maintaining) at each node in a plurality of nodes in the distributed computing system a local current count value determined at each node, copies of remote current count values determined at other nodes in the plurality of nodes and communicated to each given node and a ledger comprising a cryptographically protected history of determined local count values and communicated remote count values. The local current count value and the copies of the remote current count values are used to compute the global count value at one or more of the plurality of nodes. The ledger is used to verify an integrity of the history of determined local count values and communicated remote count values.

According to another embodiment, a distributed computing system to maintain a global count value includes a plurality of nodes, each node comprising a local memory comprising a database comprising a local current count value determined at each node, copies of remote node current count values determined at other nodes in the plurality of nodes and communicated to each node, and a ledger comprising a cryptographically protected history of determined local count values and communicated remote count values. The distributed computing system also includes a global count value determination module in communication with the database to obtain the local current count value and the copies of the remote current count values to compute the global count value. The distributed computing system further includes an auditor in communication with the database to obtain the cryptographically protected history and to verify an integrity of the history of determined local count values and communicated remote count values.

According to another embodiment, a computer program, comprises instructions which, when executed on at least one processor, cause the at least one processor to carry out the method according to any of the methods described herein.

According to another embodiment, a carrier contains the computer program described above, wherein the carrier is one of an electronic signal, an optical signal, a radio signal, or a computer readable storage medium.

According to another embodiment, an apparatus is adapted to maintain at each node in a plurality of nodes in the distributed computing system a local current count value determined at each node, copies of remote current count values determined at other nodes in the plurality of nodes and communicated to each node and a ledger comprising a cryptographically protected history of determined local count values and communicated remote count values, to use the local current count value and the copies of the remote current count values to compute the global count value at one or more of the plurality of nodes, and to use the ledger to verify an integrity of the history of determined local count values and communicated remote count values.

According to another embodiment an apparatus comprises a first module configured to maintain at each node in a plurality of nodes in the distributed computing system a local current count value determined at each node, copies of remote current count values determined at other nodes in the plurality of nodes and communicated to each node and a ledger comprising a cryptographically protected history of determined local count values and communicated remote count values; a second module configured to use the local current count value and the copies of the remote current count values to compute the global count value at one or more of the plurality of nodes; and a third module configured to use the ledger to verify an integrity of the history of determined local count values and communicated remote count values.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
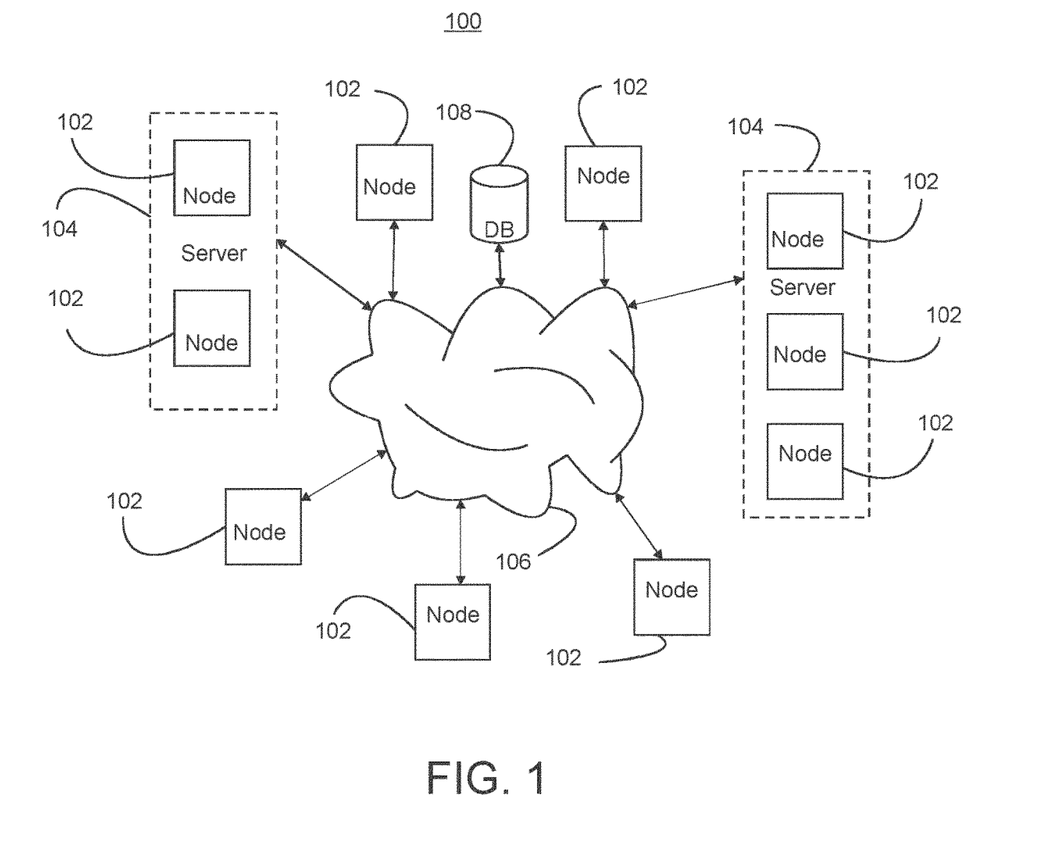
FIG. 1 is a block diagram illustrating a distributed computing system according to one embodiment.

Referring initially to FIG. 1, an embodiment of a distributed computing system 100 to maintain a global count value is illustrated. The distributed computing system includes a plurality of nodes 102. The nodes are in communication across one or more networks 106 including local area networks and wide area networks. Each node can represent a physical server or computer or can be a virtual partition in a given server or computer 104. In general, the nodes communicate by passing messages such as signaling messages across the network to coordinate and provide the desired computing services or data to a user. Each node is capable of functioning autonomously to provide those computing services or data accesses. The distributed computing system can also include one or more databases 108. These databases can be used to store software that is executed by the nodes in the system to facilitate the operation of the distributed computing system. The databases can store information on the subscriptions, services or products available to users. The databases can also include data that is being accessed by the nodes for users of the distributed computing system and software programs that are executed on the nodes for the users.

Figure 2:
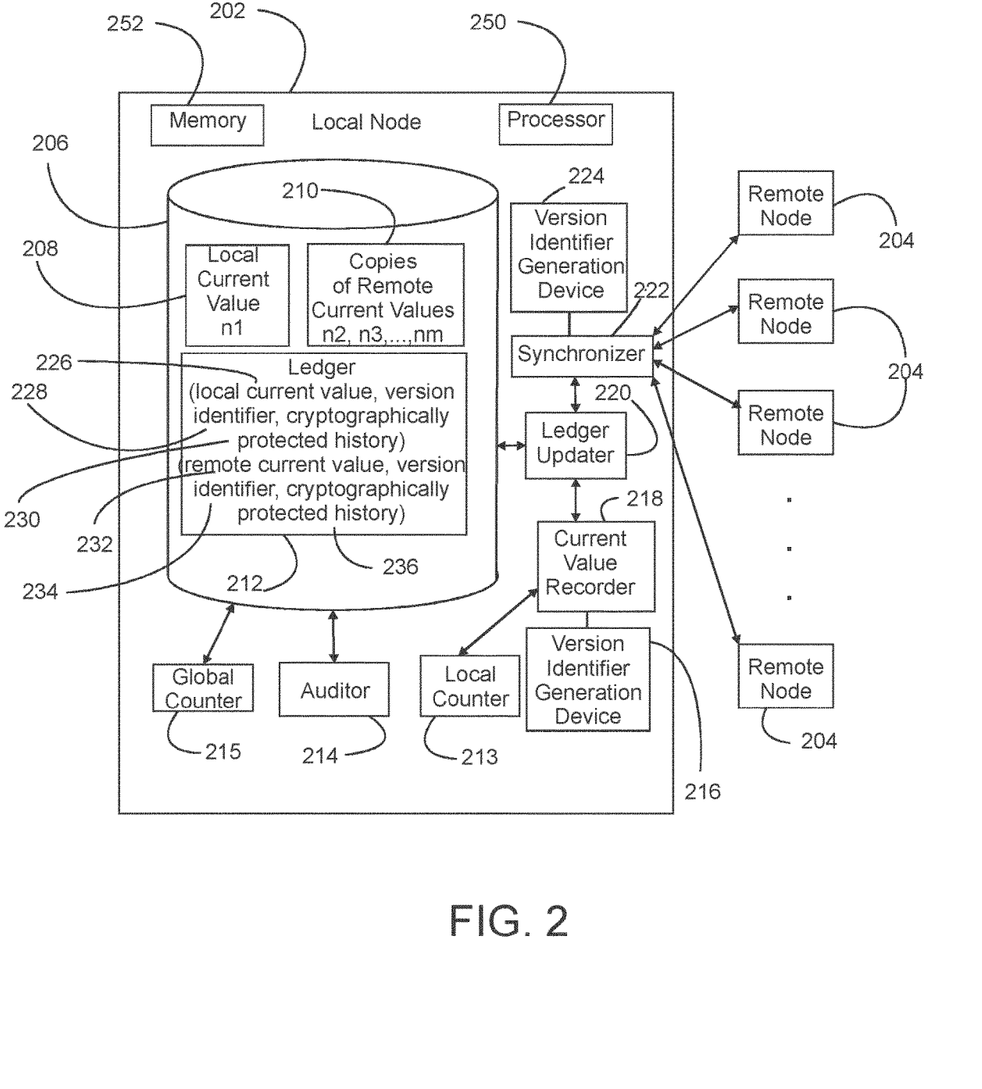
FIG. 2 is a block diagram illustrating one local node in the distributed computing system according to an embodiment.

Referring now to FIG. 2, each node 202 in the plurality of nodes includes a local memory 206 storing a database, i.e., a local database. The database stores a local current count value 208 recorded at that node. The current count value is a local current count value, because the node is considered a local node, and the other nodes 204 in the plurality of nodes are considered remote nodes, i.e., remote to the local node. The database also maintains copies of remote current count values 210 determined at other given nodes 204 in the plurality of nodes, i.e., the remote nodes, and communicated to the local node.

According to some embodiments, the count value can, for example, be any type of counted, accumulated or debited quantity of an item or service that is being delivered to a user as part of a contracted service. Therefore the count value can be the current value of an actual counter located at each node. The counter can be logging a number of accesses, a number of data records access or a total accumulated or elapsed time. The current value can also be accumulated time on a clock or timer, quantity of bandwidth used, percentage of computing resources used either in total or at any given instance in time, number of concurrent users of a computing system, a database or a computing resource, number of concurrent computing sessions, number of concurrent instances of a computer software program and number of queries submitted. In addition to accumulating values, the count value can represent a balance of credits or money available following debits to a total contracted count value. In one embodiment, each node includes a counter 213 to count usage of a resource at each node. Each local current count value is a local current count of usage of the resource, and each remote current count value is a remote current count of usage of the resource.

The database at each node also includes a ledger 212 containing a cryptographically protected history of local count values 230 and remote count values 236. Therefore, the history of all count values recorded at each node and received at each node from remote nodes, i.e., count values recorded at the remote nodes, is maintained at each node in the plurality of nodes. These histories, however, are cryptographically protected, i.e., maintained in an encrypted format. Any suitable method for encrypting and storing data that is known and available in the art can be used including hashing, symmetric encryption and asymmetric encryption. According to some embodiments, hashing is used. In these embodiments, the data in the history of local and remote count values is processed through one or more hash functions. Suitable hash functions include, but are not limited to, cryptographic hash functions, perfect hash functions, tabulation hashing functions, universal hashing functions, locality sensitive hashing functions and rolling hash functions.

The history is a chronology of count values recorded and received at any given node in the plurality of nodes. As new local current values are recorded and new remote current values are received, the local current values 226 and remote current count values 232 are added to the ledger and incorporated into the cryptographically protected history. Therefore, each node includes a local current count value recorder 218 to record the current local count value. In one embodiment, the local current count value recorder is in communication with the counter 213.

To maintain the chronology of recorded count values at the local node, each local current count value has an associated version identifier. The version identified establishes the location of a given local current count value among all local current count values and can be any value or identifier capable of communicating relative location or value among objects. Suitable version identifiers include, but are not limited to, a number, a date, a timestamp, a table position, a vector and a unique alpha-numeric designation. To provide the unique version identifier for each local current count value, each node includes a version identifier generation device 216 in communication with the local count value recorder to associate a version identifier with the current local count value in the database indicating a version associated with the given local current count value. In one embodiment, the version identifier generation device in communication with the local count value recorder is a clock that generates a timestamp.

Each node includes a ledger updater 220 in communication with the local current count value recorder and the database. The ledger updater 220 is used to store the current local count value 208 in the database, to include the local current count value 226 and the given version identifier 228 in the ledger 212 and to incorporate the given local current count value and the given version identifier into the cryptographically protected history 230 in the ledger 212.

For count values communicated from remote nodes, each node, i.e., each local node, includes a synchronizer 222 in communication with other nodes 204, i.e., remote nodes, in the distributed computing system. The synchronizer is used to obtain from remote nodes a remote current count value at the remote node 232. The synchronizer 222 will also obtain a remote node version identifier associated with the remote current value at the remote node, and a remote node cryptographically protected history, i.e., the current cryptographically protected history at the remote node at the time of communication of the remote current count value.

To maintain the chronology of the history at the local node, a version identifier generation device 224 is provided in communication with the synchronizer to associate a local node version identifier indicating a version associated with the remote current count value, e.g., a time at which the remote current count value, the remote node version identifier and the remote node cryptographically protected history are received at the local node. Suitable version identifier generation devices in communication with the synchronizer are the same as the version identifier generation device in communication with the local count value recorder. In one embodiment, only a single version identifier generation device is provided in communication with both the current count value recorder and the synchronizer.

The ledger updater 220 is in communication with the synchronizer and the database to incorporate into the ledger the remote current count value 232 and the local node version identifier 234. In addition, the synchronizer incorporates the remote current count value, the local node version identifier, the remote node version identifier and the remote node cryptographically protected history into the cryptographically protected history 236 in the ledger of the local node. The synchronizer incorporates the remote current count value 232 into the copies of the remote current count values 210 at the local node. In one embodiment, the synchronizer analyzes the remote node version identifier to confirm that the remote current count value represents an updated remote current count value before incorporating the remote current count value in the copies of the remote current count values 210 maintained at the local node. The various functional modules illustrated and described above with respect to FIG. 2 can be implemented in hardware, software or a combination of hardware and software modules, e.g., using one or more processors 250 and one or more memory devices 252.

Figure 3:
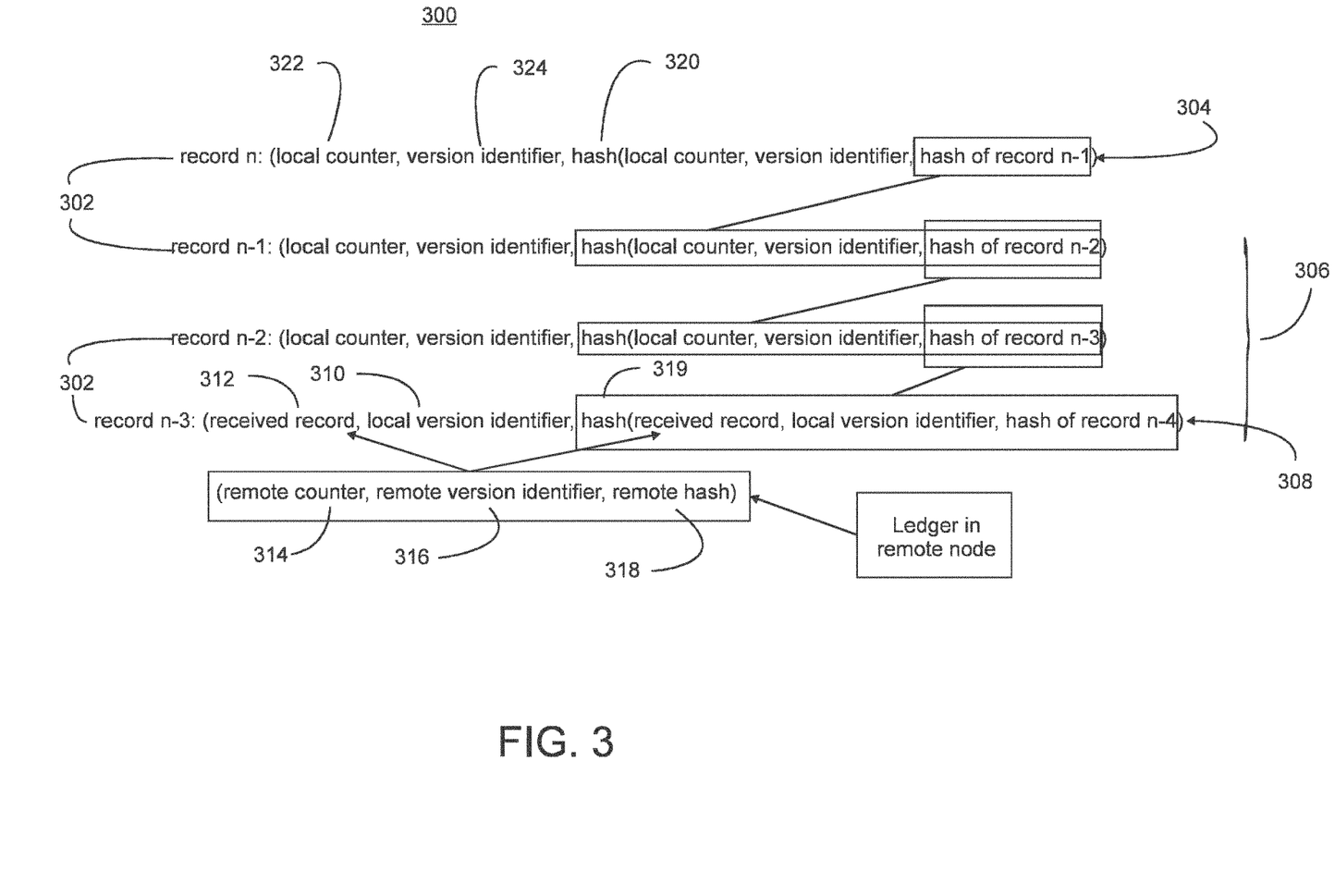
FIG. 3 illustrates an embodiment of a ledger stored at a local node.

As count values are locally recorded and received from remote nodes, new ledger entries or records are created. According to some embodiments, not all of the count values received from remote nodes need to be used to create new records in the ledger. Referring to FIG. 3, an embodiment of the ledger 300 includes a plurality of records 302. In one embodiment, the records are arranged as a plurality of rows. Each record is associated with a unique version identifier that establishes the location of that record among the plurality of records. As illustrated the plurality of ledger records includes a local current count value ledger record 304. This local current count value ledger record includes a unique local current count value 322, a unique version identifier 324 for the unique local current count value and a cryptographically protected history entry 320. In one embodiment, the cryptographically protected history is a hash chain incorporating all preceding ledger records 306 having version identifiers preceding, e.g., greater than, the unique version identifier of the local current count value ledger record 304. In addition, the hash chain includes the local current count value 322 and the given version identifier 324, which are incorporated into the hash chain by the ledger updater. As the cryptographically protected history in each record incorporates all preceding ledger records, all preceding ledger records can be incorporated into the hash 320 of the local current count value ledger record by incorporating the cryptographically protected history or hash 321 from the immediately preceding ledger record.

The plurality of ledger records also includes remote value ledger records 308. Each remote value ledger record includes the received record 312 from the remote node, which includes the remote current count value 314, the remote node version identifier 314 and the remote node cryptographically protected history 318 received at the local node from the ledger 313, e.g., top row, of the remote node. Each remote value ledger record also includes the local node version identifier 310 and a cryptographically protected history 319 entry, e.g., a hash chain, incorporating all preceding ledger rows records of the local node having version identifiers preceding the local node version identifier, the received record that includes the remote current count value, the remote node version identifier and the remote node cryptographically protected history and the local node version identifier. In one embodiment, the hash chain in any given local current count value ledger record or remote value ledger record can be determined by including all of the data in a hash function and calculating an output for the hash function. Alternatively, the hash chain is evaluated to see what updates are needed and is only updated to include new information added to the cryptographically protected history, i.e., incremental hash chain updating.

Returning to FIG. 2, each node includes a global count value determination module 215 in communication with the database to obtain the local current count value 208 and the copies of the remote current count values 210 to compute the global count value. This global count value can be determined at multiple nodes in the distributed computing system and can be compared across nodes. In one embodiment, the global count value determination module includes a summation module to obtain a sum of usage from the local current count and remote current counts stored at the local node.

Each node includes an auditor 214 in communication with the database to obtain the cryptographically protected history and to verify an integrity of the history of recorded local count values and communicated remote count values. The auditor verifies the integrity of the history of determined local count current values and communicated remote current count values by recalculating the cryptographically protected history of the local count values and remote count values or by comparing cryptographically protected histories maintained at two nodes.

Figure 4:
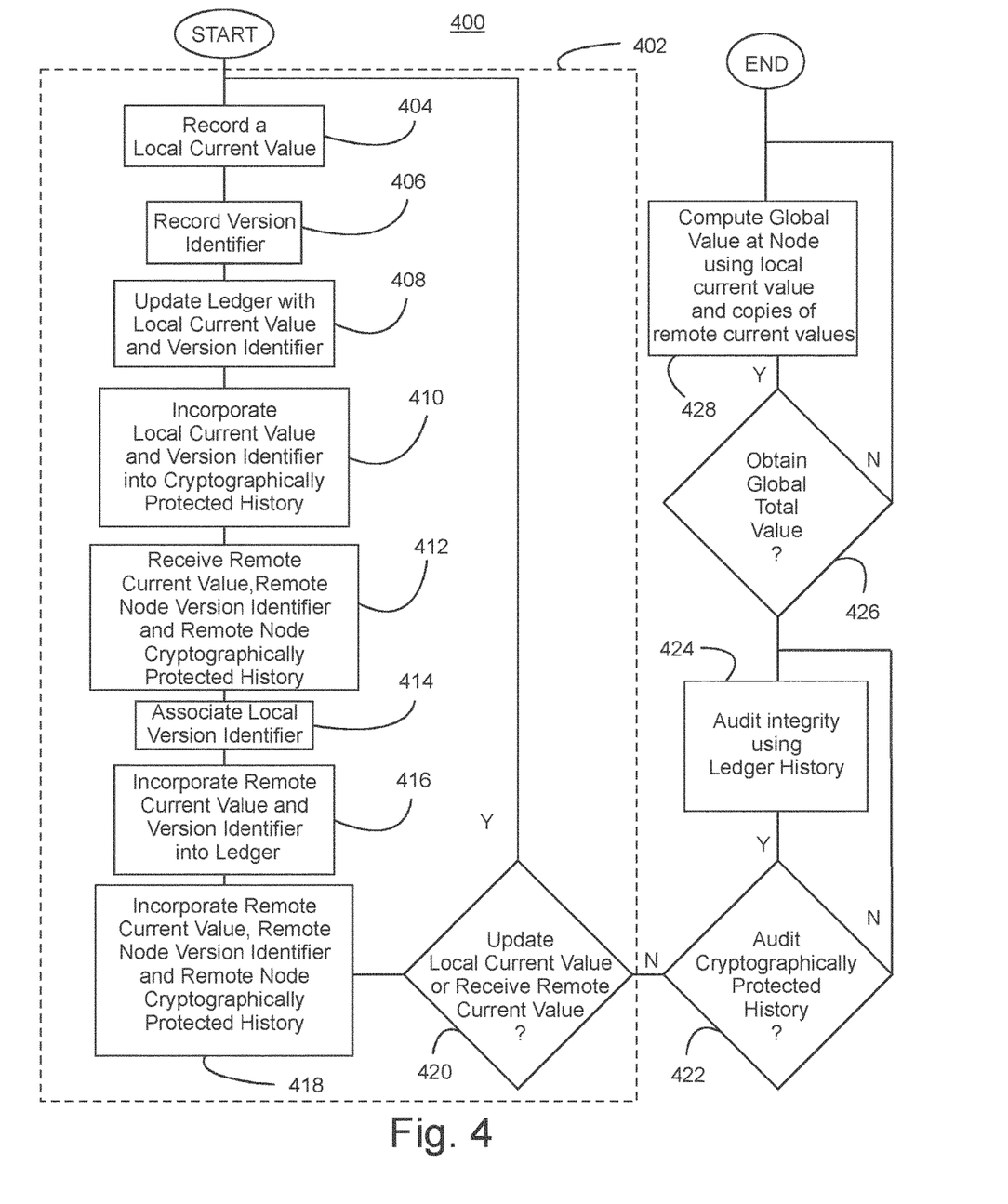
FIG. 4 is a flowchart of an embodiment of a method for maintaining a global count value in a distributed computing system.

Referring to FIG. 4, exemplary embodiments are also directed to a method 400 of maintaining a global count value in a distributed computing system. The method maintains 402 at each node in a plurality of nodes in the distributed computing system a local current count value 208 that is determined, e.g., recorded, at each given node, copies of remote current count values 210 that are determined, e.g., recorded, at other nodes in the plurality of nodes and communicated to each node and a ledger 212 containing a cryptographically protected history 230, 236 of the determined local count values and the communicated remote count values. In one embodiment, copies of local current count values are communicated from each node to other given nodes by including the copies of the local current count values in inter-node communications required for function of the distributed computing system.

In one embodiment, the ledger contains a plurality of ledger records including local current count value ledger records. Any given local current count value ledger record includes a unique local current count value, a unique version identifier and a cryptographically protected history entry incorporating all preceding ledger records having version identifiers which precede, e.g., are smaller than, the unique version identifier of the local current count value ledger record. In one embodiment, the cryptographically protected history is a hash chain incorporating all preceding ledger records, and the local current count value and the version identifier are incorporated into the hash chain. In embodiment, the ledger records include remote value ledger records. A remote value ledger record includes the received record including the remote current count value, the remote node version identifier and the remote node cryptographically protected history, the local node version identifier and a cryptographically protected history entry incorporating all preceding ledger records of the local node having version identifiers preceding the local node version identifier. When the cryptographically protected history includes a hash chain incorporating all preceding ledger records, the remote current count value, the remote node version identifier and the remote node cryptographically protected history are incorporated into the hash chain.

In order to maintain the determined local count values and communicated remote count values, a local current count value is recorded at a given node 404, and a version identifier associated with the local current count value is recorded 406. The ledger is updated 408 to include or to add the local current count value and the version identifier. In addition, the local current count value and the version identifier are incorporated into the cryptographically protected history in the ledger 410.

Figure 5:
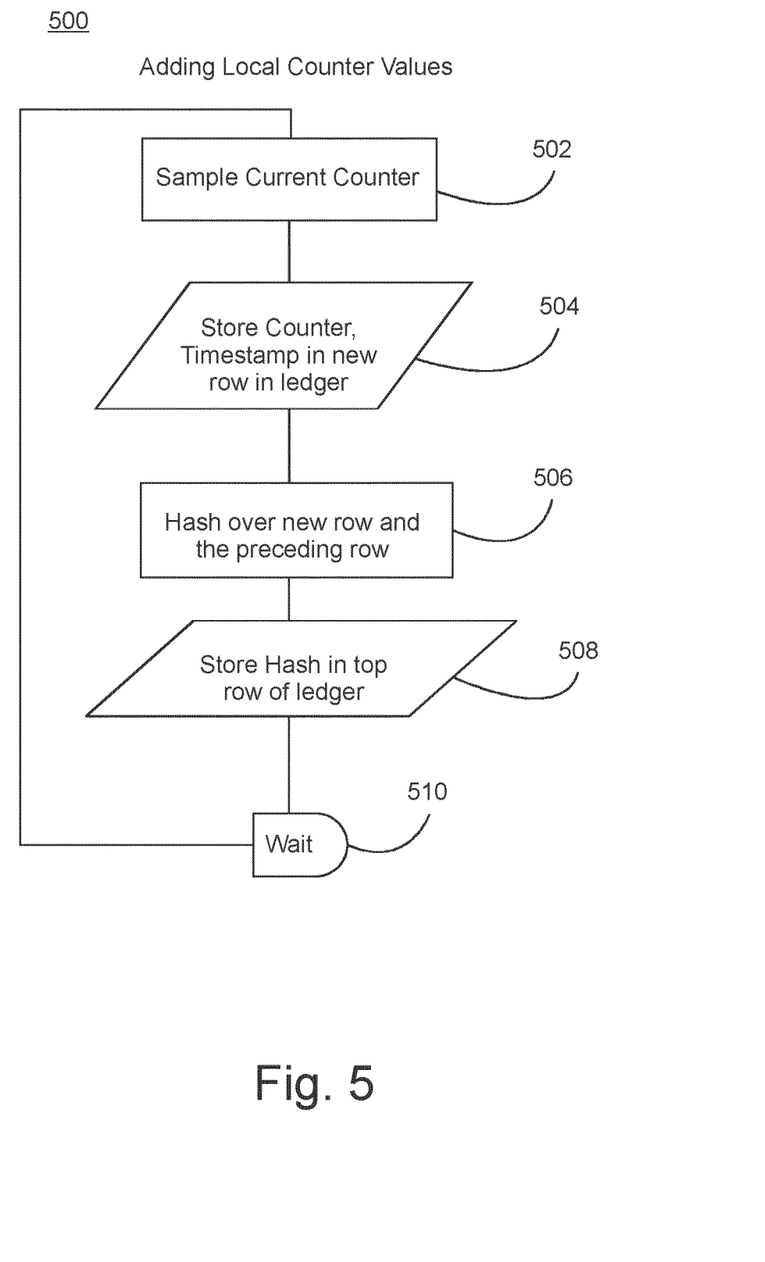
FIG. 5 is a flowchart of an embodiment of adding local counter values.

Referring now to FIG. 5, in one embodiment where each node includes a counter, the version identifier is a timestamp and the ledger includes a plurality of rows, determining the local count values includes adding local counter values 500. The current counter at the local node is sampled 502, and the current counter and associated timestamp are stored in a new row in the ledger 504. A hash is then generated using the current counter and associated timestamp in the current row in combination with the preceding row in the ledger 506. The resulting hash is stored in the top row, i.e., the new row of the ledger along with the current counter and associated timestamp 508. Additional local counter values can then be added, for example, after waiting 510 for a prescribed period of time. Although the records of the ledger are here exemplified as rows, any type of data structure or database could be used for storage—such as a linked list, an object database etc.

Returning to FIG. 4, maintaining the determined local count values and communicated remote count values also includes receiving 412 at a local node from a remote node a received record containing a remote current count value 314 recorded at the remote node, a remote node version identifier 316 indicating a version of the remote current count value and a remote node cryptographically protected history 318. A local node version identifier 310 is then associated 414 with the remote current count value. The remote current count value and the remote node version identifier are incorporated 416 into the ledger. In one embodiment, the remote node version identifier is used to determine if the remote current count value for the remote node should be used to update the copies of the remote current count values maintained at the local node.

The received record, including the remote current count value, the remote node version identifier and the remote node cryptographically protected history, is incorporated 418 into the cryptographically protected history in the ledger of the local node, along with the local node version identifier. A determination is then made regarding whether the local current value needs to be updated for whether another remote current value is to be received 420. If yes, then the steps for maintaining the determined local count values and communicated remote count values are repeated.

Figure 6:
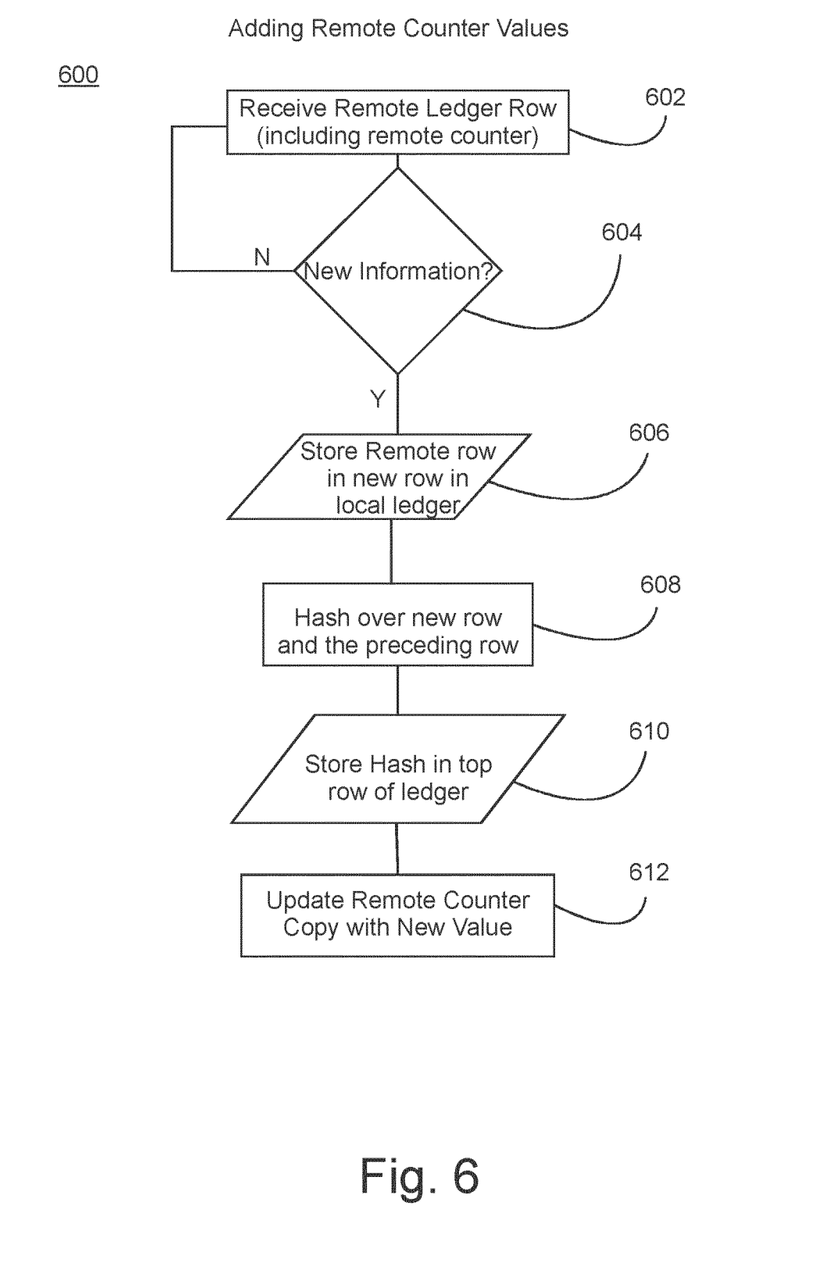
FIG. 6 is a flowchart of an embodiment of adding remote counter values.

Referring to FIG. 6, in one embodiment where each node includes a counter, the version identifier is a timestamp and the ledger includes a plurality of rows, determining the remote count values includes adding remote counter values 600. The entire ledger row, i.e., current or top remote ledger row, is received at the local node 602, including the current value of the remote counter. A determination is made regarding whether the received remote ledger row includes new information 604 or an updated remote counter value. If new information is contained in the received remote ledger row, then the received remote ledger row is stored in a new local ledger row 606. A hash is then performed over the new local ledger row and the preceding local ledger row 608. This hash is also stored in the top, i.e., new, local ledger row 610. In addition, the copy of the remote counter stored at the local node is updated 612.

Returning to FIG. 4, if no updates are to be recorded or received, then a determination is made regarding whether the cryptographically protected history at one or more the nodes in the plurality of nodes is to be audited 422. If any cryptographically protected history at any given node is to be audited, the ledger at that node is used to verify an integrity 424 of the history of determined local current count values and communicated remote current count values. Using the ledger to verify the integrity of the history of maintained local values and communicated remote values includes recalculating the cryptographically protected history, e.g., the hash chain, for all preceding ledger records or comparing a remote node cryptographically protected history to the cryptographically protected history of a local node, i.e., between two nodes.

After the integrity is audited or if the determination is made not to audit the cryptographically protected history, a determination is made regarding whether or not to calculate the global total value 426. If the global total value is to be calculated, then the local current count value and the copies of the remote current count values are used to compute the global count value 428 at one or more of the plurality of nodes.

Exemplary embodiments of systems and methods maintain accurate count values in a highly distributed architecture that lacks any single central point of configuration. Accuracy and correctness of the count values covers not missing any count value updates even in the presence of errors and failures and protecting against fraudulent attempts to modify count values. The records of counters, i.e., the history, are stored in redundant copies throughout the distributed computing system, and each copy is integrated into a local cryptographically protected structure, i.e., the hash chain, thereby inhibiting manipulation of the counters absent complete control of the entire distributed computing system. Compared to centralized bookkeeping of counters, a higher performance implementation is achieved due to the elimination of a central bottleneck. In addition, the distributed computing system can sustain a long period with nodes being off-line or unreachable, i.e., a "split-brain" scenario. During such a period the counters or count values are just maintained locally, or shared within a reachable sub-set of the nodes.

As described herein, the local ledger in each node is checked for integrity, for example, by recalculating the hash chain. This integrity check detects any change in the stored count values. In addition, exemplary embodiments incorporate parts of the ledger of the remote nodes into the ledger in the local node. This incorporation is used to verify the integrity of the ledger between the nodes by comparing these replicated parts and the integrity of their hashes. By verifying the integrity of all the ledgers together, unauthorized attempts at rewriting the stored histories require rewriting all the ledgers in the distributed computing system. Therefore, the value counting and maintenance in the distributed computing system cannot be tampered with unless the system if completely taken over. Changes in any part of the system will be detected.

Management of the ledger at each node in the distributed computing system adds local count values and regularly records the current local count value with a current timestamp that indicate at what point in time the record was done. This record (count value, timestamp) is stored at the top of the ledger together with a hash made over the record and the hash of the now second record in the ledger. Regularly the local counter is shared with other nodes by sharing the complete latest record or row of the ledger including the hash value. Therefore, very little information needs to be exchanged, but the information that is exchanged does, via the hashes, contain a digest over the complete history of the ledger.

If the integrity check fails, the complete distributed computing system could execute an immediate stop action, refusing any further work. Alternatively, the detected tampering is made visible, for example, by raising alarms, adding warnings to graphical user interfaces or running the distributed computing system in a degraded mode. In one embodiment, just the compromised part of the system is isolated from the distributed computing system. For example, a majority decision system is used where the still agreeing nodes exclude the ones not in agreement as determined by the integrity check. In general, the integrity verification mechanism only allows individual compromised nodes to "lie" about future values and not to rewrite the history.

The integrity verification mechanism checks the integrity of the ledger, not the "quality" or correctness of the count values originally put in the ledger. However, the historical information in the ledger can be useful when assessing the correctness of new values. Sudden drops in reported values or other changes in the pattern of values from some nodes could be detected. As each node has this information, a degree of validation can be applied to new values.

To protect against a continuously growing ledger, each ledger can be shortened after a specific period of time. For example, ledger shortening can be conducted when the distributed computing system is subject to management of a trusted party, e.g., when trusted personnel are logged on or the distributed computing system is in technical contact with a trusted system. Suitable methods for compaction of each ledger include, but are not limited to, dropping a part of the ledger and replacing the dropped part with a cryptographically verifiable signature.

In addition to being used to enforce licensed-based accesses to products and services, exemplary embodiments can be applied to any application that can utilize a distributed counting or measurement scheme with an integrity protected ledger. For example, embodiments can include application to resource allocation in a cloud environment where resource measurements from individual servers are used as input into global allocation decisions, e.g., scale-out/in decisions.

It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Figure 7:
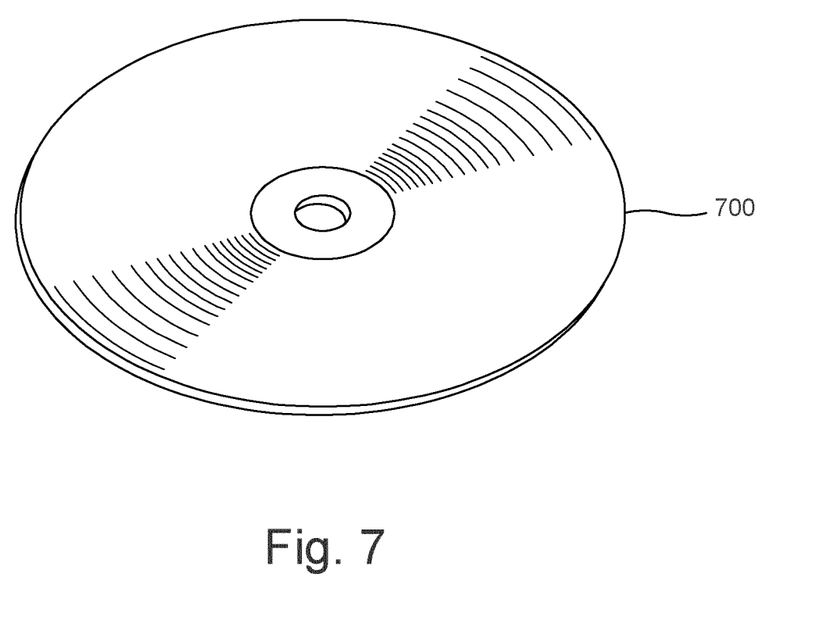
FIG. 7 depicts a carrier on which a computer program according to an embodiment can be stored.

Although the features and elements of the present exemplary embodiments are described in the embodiments in particular combinations, each feature or element can be used alone without the other features and elements of the embodiments or in various combinations with or without other features and elements disclosed herein. Various methods can be implemented as software or computer programs, e.g., stored on a carrier, wherein the carrier is one of an electronic signal, an optical signal, a radio signal, or a computer readable storage medium. An example is provided in FIG. 7 as compact disc 700.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method of maintaining a global count value in a distributed computing system, the method comprising:
    maintaining at a local node in a plurality of nodes in the distributed computing system:
        a local current count value determined at the local node,
        a local set of copies of remote current count values determined at other nodes in the plurality of nodes and communicated to the local node, and
        a local ledger comprising a cryptographically protected history of the local count value and the local set of copies of remote count values;
    computing the local current count value at the local node using a first usage metric of a first computing resource associated with the local node; and
    computing the global count value at the local node using the local current count value and the local set of copies of remote current count values.

2. The method of claim 1, wherein:
    each of the remote current count values determined at other nodes in the plurality of nodes is communicated to the local node in inter-node communications required for function of the distributed computing system.

3. The method of claim 1, further comprising:
    recording a version identifier associated with the local current count value;
    updating the local ledger to include the local current count value and the version identifier; and
    incorporating the local current count value and the version identifier into the cryptographically protected history in the local ledger.

4. The method of claim 3, wherein:
    the local ledger comprises a plurality of ledger records comprising local current count value ledger records, any local current count value ledger record comprising:
        a unique local current count value;
        a unique version identifier; and
        a cryptographically protected history entry incorporating all preceding ledger records having version identifiers greater than the unique version identifier of the local current count value ledger record.

5. The method of claim 4, wherein:
    the cryptographically protected history entry comprises a hash chain incorporating all preceding ledger records; and
    incorporating the local current count value and the version identifier comprises incorporating the local current count value and the version identifier into the hash chain.

6. The method of claim 5, further comprising verifying the integrity of the cryptographically protected history by recalculating the hash chain for all preceding ledger records.

7. The method of claim 3, further comprising:
    receiving at the local node from a remote node of the plurality of nodes:
        a received remote current count value of the remote node, the received remote current count value being computed at the remote node using a second usage metric of a second computing resource associated with the remote node;
        a received remote node version identifier indicating a version of the remote current count value; and
        a received remote node cryptographically protected history;
    associating a local node version identifier with the received remote current count value, the received remote node version identifier and the received remote node cryptographically protected history; and
    incorporating the received remote current count value, the received remote node version identifier and the received remote node cryptographically protected history into the cryptographically protected history in the local ledger of the local node.

8. The method of claim 7, further comprising using determining, based on the received remote node version identifier, whether to use the received remote current count value for the remote node to update the local set of copies of remote current count values maintained at the local node.

9. The method of claim 7, wherein:
    the local ledger at the local node comprises a plurality of ledger records comprising remote value ledger records, each remote value ledger record comprising:
        a remote current count value computed at a respective remote node using a respective usage metric of a respective computing resource associated with the respective remote node, a remote node version identifier and a remote node cryptographically protected history;
        a local node version identifier; and
        a remote cryptographically protected history entry incorporating all preceding local ledger records of the local node having version identifiers preceding the local node version identifier.

10. The method of claim 9, wherein:
the remote cryptographically protected history entry comprises a hash chain incorporating all preceding ledger records; and
incorporating the remote current count value, the remote node version identifier and the remote node cryptographically protected history comprises incorporating the remote current count value, the remote node version identifier and the remote node cryptographically protected history into the hash chain.

11. The method of claim 7, further comprising verifying the integrity of the cryptographically protected history of the local count values and the local set of copies of remote count values by comparing the received remote node cryptographically protected history to the cryptographically protected history of the local node.

* * * * *